Oct. 27, 1936.   J. R. HAINES   2,058,546
TURN INDICATING LIGHT
Filed March 18, 1936

WITNESS:

INVENTOR
John Ralph Haines
BY
Busser and Harding
ATTORNEYS.

Patented Oct. 27, 1936

2,058,546

UNITED STATES PATENT OFFICE 2,058,546

TURN INDICATING LIGHT

John Ralph Haines, Tabernacle, N. J., assignor to Arrow Safety Device Co., Medford, N. J., a corporation of New Jersey Application March 18, 1936, Serial No. 69,435

2 Claims. (Cl. 177—329)

This invention relates to a turn-indicating light for motor vehicles.

Proposals have already been made to provide turn-indicating lights on motor vehicles arranged to be operated either automatically as the steering wheel is turned or by a separate action of the operator upon a switch to show when the vehicle is about to turn. Particularly such lights are desirable to indicate left turns because of the general disturbance to traffic caused thereby.

In some arrangements heretofore proposed for indicating turns the indication is made not only rearwardly but also forwardly, so as to warn not only following vehicles but also approaching vehicles and pedestrians. In such arrangements errors in indication may occur due to the fact that where a device of that type is provided light may shine completely through the apparatus from another automobile headlight or street lamp with the result that some other party may believe that a turn is to be made when the driver of the vehicle carrying the indicator has not so intended and is, in fact, ignorant of the impression that has been given.

It is the object of the present invention to provide a turn-indicating device of the general nature described which is illuminated by a single lamp and which will not give false indications due to direct transmission of the light through the device.

Other objects of the invention relating to details of construction will be apparent from the following description read in conjunction with the accompanying drawing, in which.

Figure 1:
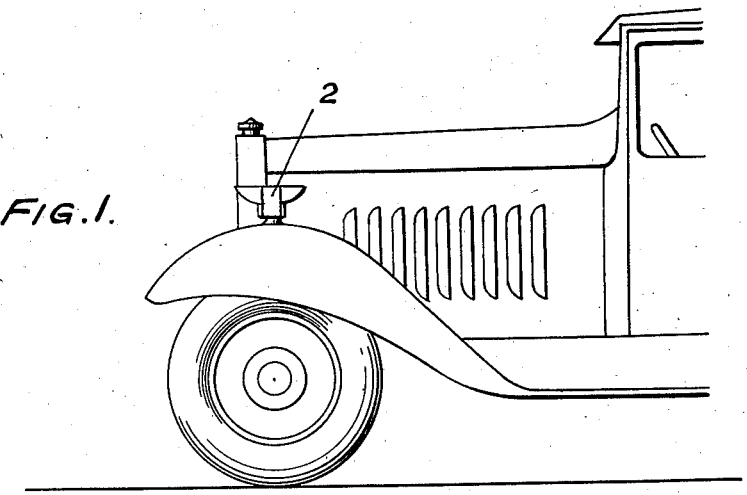
Fig. 1 is a fragmentary elevation of a vehicle carrying the improved indicating lamp.
Figure 2:
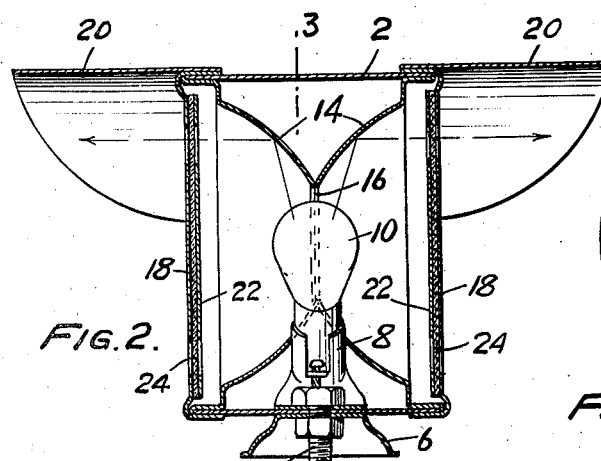
Fig. 2 is a vertical section through the lamp.
Figure 3:
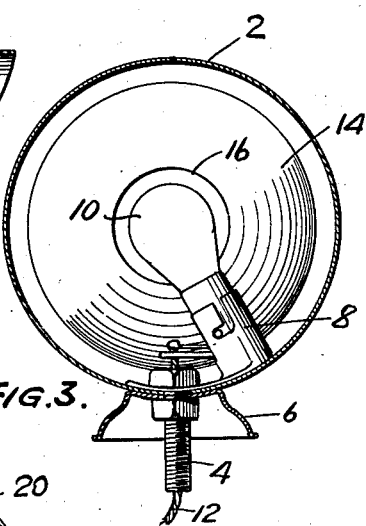
Fig. 3 is a transverse vertical section taken on the plane indicated at 3—3 in Fig. 2.

The lamp comprises a housing 2 in the form of a cylinder which may be clamped by means of a hollow bolt arrangement indicated at 4 to the fender or other suitable part of a vehicle, there being provided a stand 6 to provide stability and improve the appearance. A socket 8 arranged within the housing carries a lamp 10 to which electrical connection may be made through a cable 12 passing through the hollow bolt 4. The lamp may be illuminated at the desired times either automatically in manners heretofore used or manually by the actuation of a suitable switch within convenient reach of the operator.

A pair of concave mirrors 14 or a single mirror made in the form of a concave pair is provided within the housing with its reflecting surfaces facing forwardly and rearwardly. The lamp 10 is located within an opening 16 formed by the cut away central portions of the reflecting surfaces. The clearance about the lamp is desirably relatively small, as indicated.

Figure 4:
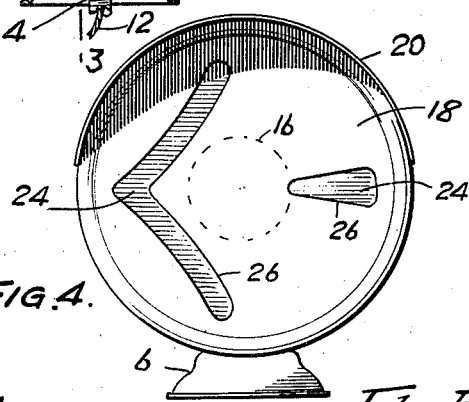
Fig. 4 is a rear elevation of the lamp.

The ends of the housing are closed by opaque members 18 which are provided with openings such as 26 outlining direction indicating arrows. The openings in the forward end of the housing form, of course, a mirror image of those shown in Fig. 4, so that in each case the arrow points to the left. Additionally, of course, another pair may be provided to indicate a right turn. The openings 26 are preferably covered by glass or composition transparent or translucent members 24 which may be suitably colored to attract attention. These may be held in position against the ends 18 by internal plates 22 having cut-out portions corresponding with 26. The inner faces of these members 22 are preferably whitened in order to reflect light interiorly of the housing thereby increasing the effective illumination passing through the openings. Visors 20 are desirably provided to shade the ends from sky illumination during the daytime so that the indications are more readily visible.

It will be noted that the openings 26 are so arranged as to be primarily outside the opening 16 from a radial standpoint. The reflecting surfaces provided by 14 therefore not only act to increase the signalling illumination but also act as baffles to prevent the direct transmission of light through the signal so that irrespective, for example, of an approaching headlight, the rays will not pass through the signal to give a turn indication to a following vehicle, this being true despite the fact that a single lamp 10 is used to illuminate both the front and rear indicating elements.

It will be clear that variations may be made in the specific embodiment of the invention without departing from its scope as defined in the following claims.

What I claim and desire to protect by Letters Patent is:

1. A turn indicating device for motor vehicles comprising a housing having front and rear light transmitting openings indicative of turns, a single lamp for supplying light to be transmitted through the front and rear openings, and means providing a pair of reflectors forwardly and rearwardly directed having central openings, said lamp being located in the central openings of both reflectors, said reflectors acting as a barrier to prevent external light from passing directly through the front and rear light transmitting openings, said front and rear light transmitting openings being substantially only at the sides of said central openings.

2. A turn indicating device for motor vehicles comprising a housing having front and rear light transmitting openings indicative of turns, a single lamp for supplying light to be transmitted through the front and rear openings, and means between the front and rear light transmitting openings providing a barrier to the direct transmission of external light through the front and rear openings, said barrier being provided with an opening out of alignment with said front and rear light transmitting openings and arranged to receive said lamp.

JOHN RALPH HAINES.